UNITED STATES PATENT OFFICE.

LEO STEIN, OF NEWARK, NEW JERSEY, ASSIGNOR OF ONE-HALF TO JOHN C. DEHLS, OF BROOKLYN, NEW YORK.

EXTRACT FOR CARBONATED BEVERAGES.

1,237,723. Specification of Letters Patent. Patented Aug. 21, 1917.

No Drawing. Application filed May 5, 1917. Serial No. 166,538.

*To all whom it may concern:*

Be it known that I, LEO STEIN, a citizen of the United States, and a resident of Newark, in the county of Essex and State of New Jersey, have invented certain new and useful Improvements in Extracts for Carbonated Beverages, of which the following is a specification.

My invention relates to a new nitrogenous substance derived from yeast cells and animal gelatin, and a new extract containing this new nitrogenous substance. My new substance and my new composition containing this substance, have the characteristic of producing a lasting foam-stand in carbonated beverages, and, therefore, are suitable for the manufacture of carbonated beverages, where such a foam-stand is desirable or necessary. My new substance contains soluble or colloidally soluble proteins or peptones, derived from yeast cells and gelatin, through the action of proteolytic enzyms, present in the yeast cells, on the protein of the yeast cells and on the protein of the gelatin.

In carrying out my invention I proceed as follows:

To one hundred (100) parts of yeast, properly washed and cleaned, I preferably admix five (5) parts of granulated animal gelatin. I, however, do not want to limit myself to these given proportions. This mixture is heated in an incubator at a temperature of not lower than 38° and not higher than 40° centigrade, and occasionally stirred. After a few hours the gelatin granules disappear and a homogeneous mixture of very high viscosity ensues. After about twelve hours under the heat and stirring, this high viscosity becomes gradually reduced, and this is due to the action of the proteolytic enzyms in the yeast, which exert their hydrolyzing action both on the nitrogenous contents of the yeast cells and on the nitrogenous contents of the gelatin. After about seventy-two hours under the heat, the re-action is complete and any further heating in the incubator is unnecessary. The mixture is removed from the incubator and quickly brought to the boiling point, whereby the surplus liquid is evaporated and the mixture brought to a syrupy consistency or dryness, as desired. If the process is carried out at a higher temperature, say at 42° to 44° centigrade, complete liquefaction takes place. The enzyms work more intensively on the high molecular structure of the yeast and gelatin protein, breaking it down into nitrogenous substances of simple structure, thoroughly liquefying the mixture. Such a completely liquefied product can, also, be used for my purposes, but the foam-stand is not as lasting as with a product made at 38° to 40° centigrade. With the temperature that I employ, I assume that principally bodies of smaller molecular structure than proteins and of larger molecular structure than amino acids are obtained, which have the characteristics of fairly high viscosity, producing a lasting foam-stand in carbonated beverages. Amino acids of small molecular structure, as ensue when the temperature of 40° centigrade is overstepped, show a low viscosity, and are less suitable to produce a lasting foam-stand in carbonated beverages.

My new substance is a mixture of complex nature, containing the hydrolyzation products of proteins and nucleo proteins of vegetable and animal origin, partly soluble or colloidally soluble in water, and having mainly the characteristics of peptones. This hydrolyzation product or polypeptone I will mix with such extract-materials as are used in the manufacture of carbonated beverages, namely, acids or acid salts, preferably phosphoric acid or phosphoric acid salt, carbohydrates of the sugar group, and flavors. This mixture will contain all extractive matter of carbonated beverages, either in syrupy or dry form. It may simply be diluted with water, filtered and carbonated; or in order to produce a beverage with characteristics similar to beer, the mixture may be dissolved in water and boiled with hops, filtered and carbonated; or it may be dissolved in water, boiled with hops, cooled, pitched with yeast, to produce a certain amount of alcohol, filtered and carbonated. Ordinarily I will admix to my polypeptone, an acid phosphate, carbohydrates, such as dextrose, levulose, maltose, or dextrin, and bees' honey. The latter substance produces a very fine aroma and taste.

What I claim as my invention and desire to secure by Letters-Patent, is:

1. A polypeptone comprising the hydrolyzation products of proteolytic enzyms on a mixture of vegetable protein and animal protein, with an admixture of an acid phosphate, suitable for the manufacture of carbonated beverages.

2. A polypeptone comprising the hydrolyzation products of the proteolytic enzyms of yeast on a mixture of yeast and an animal protein, with an admixture of an acid phosphate, suitable for the manufacture of carbonated beverages.

3. A polypeptone comprising the hydrolyzation products of the proteolytic enzyms of yeast on a mixture of yeast and gelatin, with an admixture of an acid phosphate, suitable for the manufacture of carbonated beverages.

4. A polypeptone comprising the hydrolyzation products of the proteolytic enzyms of yeast on a mixture of yeast and gelatin at a temperature of 38° to 40° centigrade, with an admixture of an acid phosphate, a sugar and a dextrin, suitable for the manufacture of carbonated beverages.

5. A polypeptone comprising the hydrolyzation products of the proteolytic enzyms of yeast on a mixture of yeast and gelatin at a temperature of 38° to 40° centigrade, with an admixture of an acid phosphate, a sugar, and a dextrin and flavor, suitable for the manufacture of carbonated beverages.

6. A polypeptone comprising the hydrolyzation products of the proteolytic enzyms of yeast on a mixture of yeast and gelatin at a temperature of 38° to 40° centigrade, with an admixture of an acid phosphate, a sugar, a dextrin and bees' honey, suitable for the manufacture of carbonated beverages.

7. A polypeptone comprising the hydrolyzation products of the proteolytic enzyms of yeast on a mixture of vegetable protein and animal protein, with an admixture of an acid phosphate, a sugar and a flavor, suitable for the manufacture of carbonated beverages.

Signed at New York, in the county of New York, and State of New York, this 4th day of May, A. D. 1917.

LEO STEIN.

Witnesses:
ARTHUR MARION,
CHAS. C. GILL.